US00RE38290E

(19) United States
(12) Reissued Patent
Rose

(10) Patent Number: US RE38,290 E
(45) Date of Reissued Patent: Oct. 28, 2003

(54) PERSONAL COMPUTER DATA STORAGE CARD AND METHOD FOR TRANSFERRING INFORMATION BETWEEN THE DATA STORAGE CARD AND PERSONAL COMPUTERS

(76) Inventor: David H. Rose, 9803 DePaul Dr., Bethesda, MD (US) 20817

(21) Appl. No.: 09/725,850

(22) Filed: Nov. 30, 2000

Related U.S. Patent Documents

Reissue of:
(64) Patent No.: 5,844,757
Issued: Dec. 1, 1998
Appl. No.: 08/544,950
Filed: Oct. 18, 1995

(51) Int. Cl.[7] ..... G11B 5/80; G11B 23/03
(52) U.S. Cl. ..... 360/131; 360/133; 360/2
(58) Field of Search ..... 360/131, 133, 360/2; 369/75.1, 77.1, 273

(56) References Cited

U.S. PATENT DOCUMENTS

| | | | | | |
|---|---|---|---|---|---|
| 3,684,869 | A | | 8/1972 | Reiter | 360/131 |
| 4,297,570 | A | | 10/1981 | Kowalski et al. | 235/493 |
| 4,592,042 | A | | 5/1986 | Lemelson et al. | 369/258 |
| 4,774,618 | A | | 9/1988 | Raviv | 360/133 |
| 4,812,633 | A | | 3/1989 | Vogelgesang et al. | 235/487 |
| 4,888,659 | A | | 12/1989 | Marquez | 360/132 |
| 4,903,255 | A | | 2/1990 | Sugaya et al. | 369/284 |
| 4,916,687 | A | * | 4/1990 | Endo | 369/111 |
| 5,107,099 | A | | 4/1992 | Smith | 235/449 |
| 5,208,802 | A | | 5/1993 | Suzuki et al. | 369/289 |
| 5,331,627 | A | | 7/1994 | Childers et al. | 369/291 |
| 5,356,717 | A | | 10/1994 | Choki et al. | 428/425.9 |
| 5,439,755 | A | | 8/1995 | Fujita et al. | 428/694 BP |
| 5,537,389 | A | | 7/1996 | Kuwa et al. | 369/291 |
| 5,579,296 | A | * | 11/1996 | Smith et al. | 369/273 |
| 5,621,597 | A | | 4/1997 | Ikebe et al. | 360/133 |
| 5,715,233 | A | | 2/1998 | Yoshida et al. | 369/289 |
| 5,748,600 | A | | 5/1998 | Sugano et al. | 369/112 |
| 5,844,757 | A | | 12/1998 | Rose | 360/132 |
| 5,942,165 | A | | 8/1999 | Sabatini | 264/1.33 |
| 6,011,677 | A | | 1/2000 | Rose | 360/133 |
| 6,016,298 | A | * | 1/2000 | Fischer | 369/75.1 |
| 6,016,959 | A | * | 1/2000 | Kamo et al. | 235/449 |
| 6,078,557 | A | * | 6/2000 | Pierson | 369/273 |
| 6,122,145 | A | * | 9/2000 | Hoyle | 360/133 |
| 6,131,816 | A | * | 10/2000 | Smith, Sr. | 235/475 |

FOREIGN PATENT DOCUMENTS

JP 10-289558 * 10/1998

* cited by examiner

*Primary Examiner*—Jefferson Evans

(57) ABSTRACT

A personal computer data storage card includes a substrate layer, a magnetic medium layer, and a protective layer respectively affixed together. The data storage card is typically placed within an adapter and inserted into a personal computer floppy disk drive wherein the adapter includes dimensions compatible with the floppy disk drive to permit the data storage card to rotate about an axis perpendicular to the plane of the data storage card. During rotation of the data storage card within the floppy disk drive, the data storage card traverses floppy disk drive read/write heads for information storage and retrieval. Paper may be utilized as the protective layer of the data storage card and include text or graphics to have the data storage card simultaneously function as both a data storage device and a business card or other advertisement media. Further, the data storage card may be of any shape permitting rotation of the data storage card within the adapter, and may include an additional magnetic medium layer and protective layer to provide a storage capacity substantially similar to that of standard floppy disks.

42 Claims, 4 Drawing Sheets

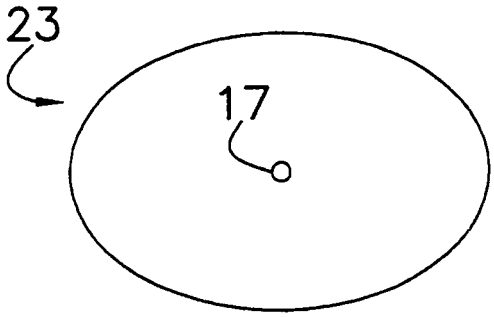
FIG. 1A
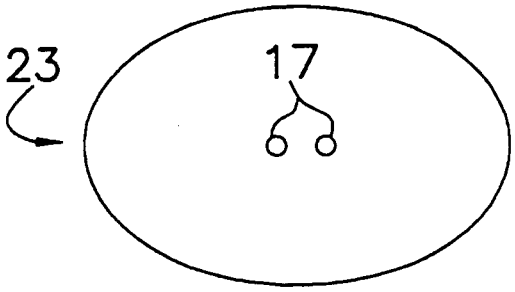
FIG. 1B
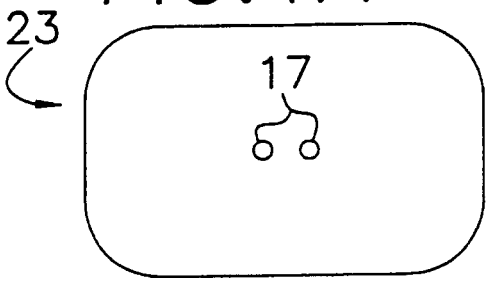
FIG. 1C
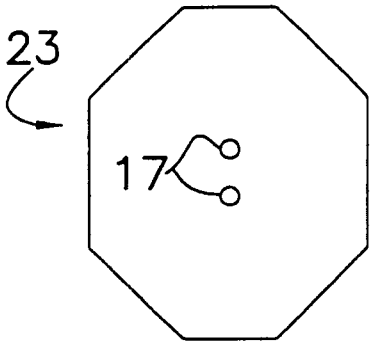
FIG. 1D
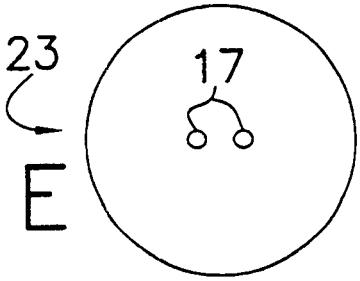
FIG. 1E
FIG. 2
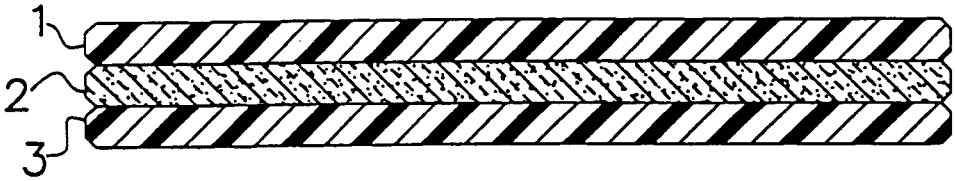
FIG. 3
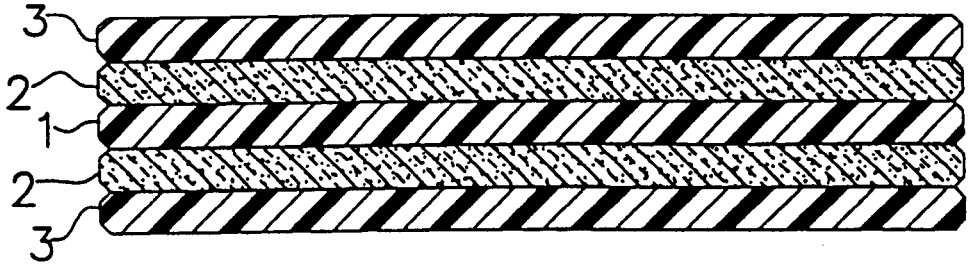

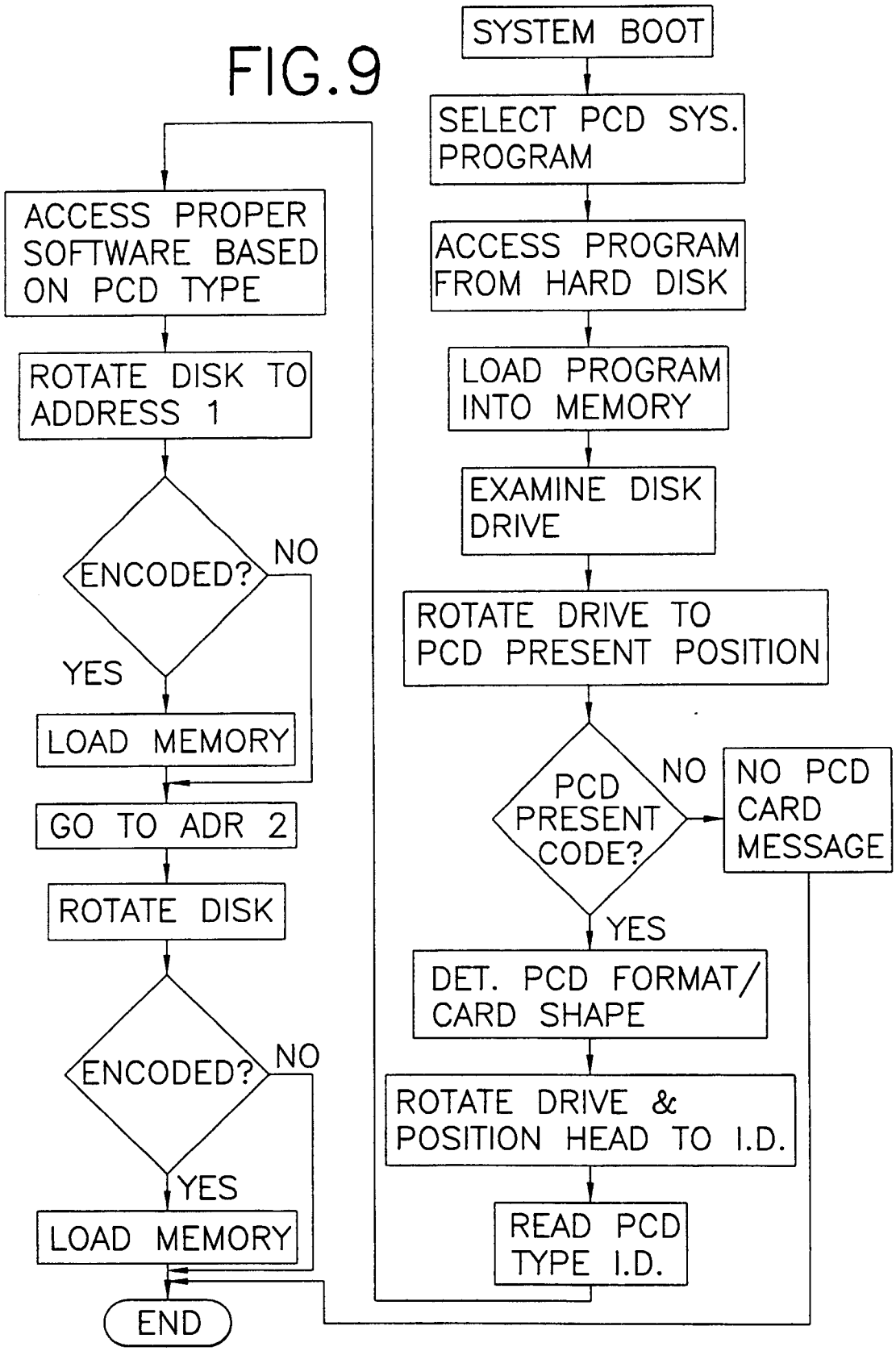
FIG.9
SYSTEM BOOT
SELECT PCD SYS. PROGRAM
ACCESS PROGRAM FROM HARD DISK
LOAD PROGRAM INTO MEMORY
EXAMINE DISK DRIVE
ROTATE DRIVE TO PCD PRESENT POSITION
PCD PRESENT CODE?
NO
NO PCD CARD MESSAGE
YES
DET. PCD FORMAT/ CARD SHAPE
ROTATE DRIVE & POSITION HEAD TO I.D.
READ PCD TYPE I.D.
ACCESS PROPER SOFTWARE BASED ON PCD TYPE
ROTATE DISK TO ADDRESS 1
ENCODED?
NO
YES
LOAD MEMORY
GO TO ADR 2
ROTATE DISK
ENCODED?
NO
YES
LOAD MEMORY
END

PERSONAL COMPUTER DATA STORAGE CARD AND METHOD FOR TRANSFERRING INFORMATION BETWEEN THE DATA STORAGE CARD AND PERSONAL COMPUTERS

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to a method and apparatus for reading and writing information on a stand alone magnetic card or disk typically adapted for use in standard three and one-half inch computer floppy disk drives. In particular, the present invention is an improvement of the magnetic cards or disks disclosed in U.S. Pat. No. 4,774,618 (Raviv), U.S. Pat. No. 5,107,099 (Smith) and U.S. Pat. No. 4,297,570 (Kowalski), the disclosure from each of which is expressly incorporated herein by reference in its entirety.

2. Discussion of Prior Art

Magnetic storage and retrieval systems using substantially circular rotatable magnetic disks are well known in the art and commonly used with modern personal computers. Such personal computers typically include floppy disk devices utilizing standard three and one-half inch floppy disks and/or five and one-quarter inch floppy disks. The standard three and one-half inch floppy disk is prevalent over the standard five and one-quarter inch floppy disk due to its smaller size and larger storage capacity. Both types of disks are typically housed in a rigid or semi-rigid outer shell functionally necessary to permit the floppy disk to rotate within the floppy disk drive of a computer and traverse read/write heads for data storage and retrieval.

Various types of storage media known in the art include magnetic strips or limited sections of magnetic media detachably affixed to cards of varying size and material. Such cards typically include credit cards, passkeys, and paper or cardstock fare cards with various devices available to read such cards. Specifically, Raviv (4,774,618) discloses a business card containing a detachable magnetic strip for storing information retrievable by a floppy disk drive of a personal computer. The magnetic strip may be detached from the business card and placed in a carrier for insertion into a floppy disk drive of a computer for information storage and retrieval. Alternatively, the entire business card may be placed in the carrier and inserted into a floppy disk drive of a computer for information storage and retrieval.

Smith (5,107,099) discloses a magnetic card reader where a credit card sized memory card contains a plastic base and a magnetic layer capable of magnetic recording and playback. An apparatus for reading and writing the credit card sized memory card contains a rotatable disk with an opening for the card whereby the card is inserted in the opening of the disk to be rotated with the disk to pass read/write heads for data manipulation.

Kowalski (4,297,570) discloses a strip for magnetically receiving information bonded to a paper substrate.

The prior art suffers from several disadvantages. Floppy disks typically have cumbersome and limiting physical characteristics requiring specific size and dimensions in order to be operable in the corresponding computer floppy disk drive. Further, a disk or group of disks with a rigid or semi-rigid outer shell are cumbersome if carried in a pocket or wallet, and have substantial weight thereby increasing the costs and burden of delivering, shipping or mailing the disks. Paper or plastic cards with a fixed magnetic medium have a storage capacity of a fraction of the capacity of a standard floppy disk (three and one-half inch or five and one-quarter inch disks) since large quantities of surface area of the paper or plastic cards do not contain fixed magnetic media and therefore cannot be utilized for storage. Further, the cards are unable to rotate in a standard three and one-half inch floppy disk drive, thereby impeding the potential of such cards for use in standard computer floppy disk drives.

OBJECTS AND SUMMARY OF THE INVENTION

Accordingly, it is an object of the present invention to provide a new and improved method and apparatus for storing and retrieving data from a standard three and one-half inch floppy disk drive.

It is another object of the present invention to increase the storage capacity of stand alone magnetic cards or disks while enabling the cards or disks to be compatible with standard three and one-half inch floppy disk drives.

Yet another object of the present invention is to provide an adapter to enable stand alone magnetic cards or disks to rotate within a standard three and one-half inch floppy disk drive in order to traverse read/write heads for data storage and retrieval.

Still another object of the present invention is to enable stand alone magnetic cards or disks to be of varying shapes capable of rotation within the standard three and one-half inch floppy disk drive for information storage and retrieval.

Yet another object of the present invention is to provide a new and improved floppy disk drive for direct insertion of a stand alone magnetic card or disk into the floppy disk drive of a computer for information storage and retrieval.

A further object of the present invention is to provide a method of controlling the read/write heads of a standard three and one-half inch floppy disk drive to accommodate the varying rotational patterns of the differing shapes of stand alone magnetic cards or disks.

The aforesaid objects are achieved individually and in combination, and it is not intended that the present invention be construed as requiring two or more of the objects to be combined unless expressly required by the claims attached hereto.

According to the present invention, a method and apparatus for reading and writing information on a stand alone magnetic card or disk is accomplished by a stand alone plastic or paper card or disk containing a magnetic medium. The card or disk includes a magnetic medium on either one or both sides of the card or disk covering substantially the entire surface area of the respective side. The card or disk is typically arranged in varying layer configurations including the fundamental card or disk structure (typically a paper or cardstock substrate, or a plastic or synthetic based material), one or more magnetic medium layers substantially similar in size to the card or disk structure and substantially covering the surface area of the card or disk structure, and one or more bonded protective layers (typically thermoplastic, paper or paper/synthetic composite material) to cover the magnetic medium. The cards or disks may be of varying shapes including polygonal, elliptical or oval, circular, rounded as well as non-symmetrical shapes. The card or disk is placed in an adapter either subsequently inserted into or permanently disposed within a floppy disk drive wherein the card or disk is engaged frictionally or mechanically by the adapter such that torque from the floppy disk drive is transferred to the adapter causing the card or disk to rotate about an axis perpendicular to the plane of the card and have the magnetic medium traverse read/write heads for information storage and retrieval. In response to the initial positioning of the card within the floppy disk drive of a computer, a code for a disk format pre-stored on the card or disk is read and processed by the computer in order to determine the proper control for the read/write heads during rotation of the card or disk based upon the shape of the card or disk.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 1A is a top view in plan of a stand alone magnetic card or disk suitable for use in an adapter frictionally engaging the card or disk according to the present invention.

FIG. 1B is a top view in plan of a stand alone magnetic card or disk suitable for use in an adapter mechanically engaging the card or disk according to the present invention.

FIGS. 1C, 1D, 1E are top views in perspective of respective differently shaped stand alone magnetic cards or disks according to the present invention.

FIG. 2 is a side view in elevation of a single-sided stand alone magnetic card or disk according to the present invention.

FIG. 3 is a side view in elevation of a double sided stand alone magnetic card or disk having two layers of a magnetic medium according to the present invention.

FIG. 9 is a procedural flow chart for controlling the read/write heads of a floppy disk drive based upon the shape of a stand alone magnetic card or disk according to the present invention.

DESCRIPTION OF THE PREFERRED EMBODIMENTS

Figure 5:
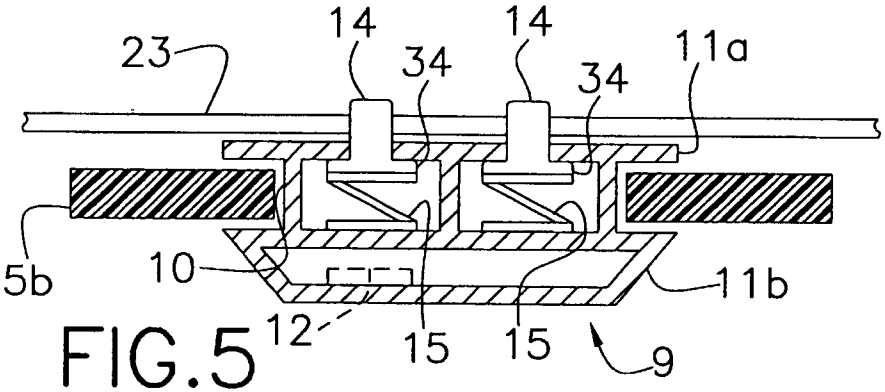
FIG. 5 is a side view in elevation and partial section of a base of the adapter of FIG. 4.
Figure 7A:
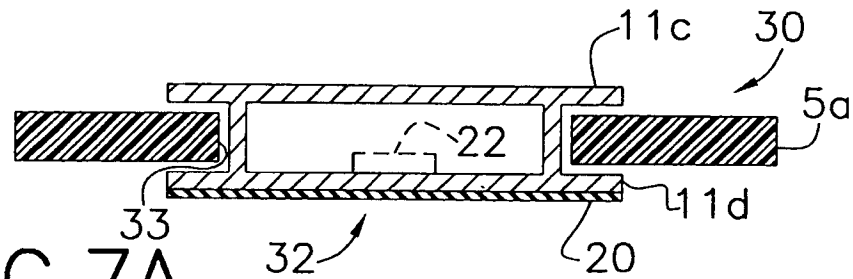
FIG. 7A is a side view in elevation and partial section of a cover of an adapter frictionally engaging a stand alone magnetic card or disk according to the present invention.
Figure 7B:
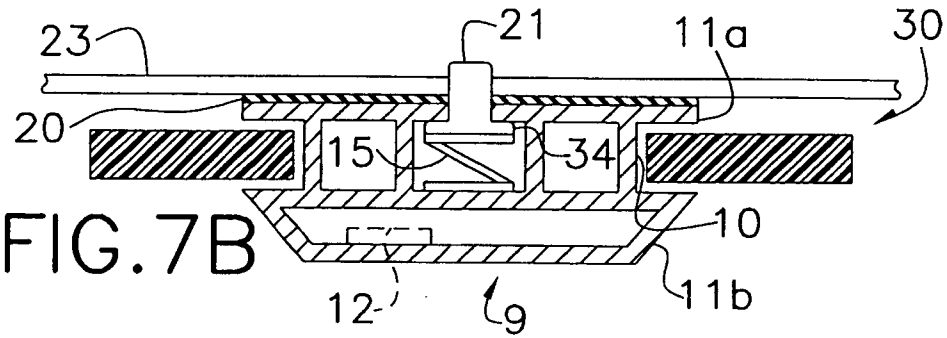
FIG. 7B is a side view in elevation and partial section of a base of an adapter frictionally engaging a stand alone magnetic card or disk according to the present invention.

FIGS. 1A, 1B, 1C, 1D, 1E, and 2 illustrate respective exemplar embodiments of the personal computer data card or disk of the present invention. Specifically, a single-sided stand alone magnetic card or disk 23 includes either single opening 17 disposed substantially at the center of card or disk 23 or dual openings 17 equally spaced from the center of card or disk 23 a short distance approximately equal to 0.2 inches, and magnetic medium layer 2 (typically high density and compatible with the standard three and one half inch floppy disk drive) disposed between a protective layer 3 (typically thermoplastic, paper or paper/synthetic composite) and a paper, cardstock or plastic substrate 1. A protective layer 3 of thermoplastic is typically affixed to magnetic medium layer 2 by use of high heat and pressure while a protective layer 3 of paper or a paper/synthetic composite is typically affixed to magnetic medium layer 2 by use of heat and a thermoplastic bonding agent. Magnetic medium layer 2 is substantially similar in size and covers substantially all of the surface area of an adjacent surface of paper, cardstock or plastic substrate 1 with an appropriate storage capacity of 0.75 megabytes. Data stored on magnetic medium layer 2 is typically encoded through magnetization and arrangement of magnetizable molecules wherein a protective layer 3 of sufficiently thin neutral material (i.e. plastic, paper or plastic paper hybrid) does not interfere with such encoding or subsequent decoding of the data. Moreover, a protective layer 3 including paper is advantageous as text and/or graphics may be placed on the paper to thereby utilize card or disk 23 simultaneously as both a data storage device and a business card or other type of advertisement media. Single or dual openings 17 enable card or disk 23 to be aligned and rotated within an adapter either subsequently inserted into or permanently disposed within a standard floppy disk drive in order to traverse read/write heads of the floppy disk drive for manipulation of the information stored on the magnetic medium as described below. Further, card or disk 23 may be of any shape (FIGS. 1C, 1D, 1E) allowing for rotation of card or disk 23 in substantially the same area as required for disks compatible with the standard three and one-half inch floppy disk drive. Varying shapes of card or disk 23 may include polygonal, elliptical or oval, circular, rounded as well as non-symmetrical shapes.

A double sided stand alone magnetic card or disk substantially similar to the single sided stand along magnetic card or disk configurations described above but providing for greater storage capacity is illustrated in FIG. 3. Specifically, paper or plastic substrate 1 is disposed between two layers of magnetic medium 2 typically of high density and compatible with the standard three and one half inch floppy disk drive. The two layers of magnetic medium 2 in combination enable card or disk 23 to have a storage capacity of approximately 1.44 megabytes and be substantially similar to the storage capacity of the standard three and one-half inch floppy disk. Each layer of magnetic medium 2 is substantially similar in size and covers substantially all of the surface area of the respective adjacent surface of plastic or paper substrate 1. Further, each layer of magnetic medium 2 is adjacent a protective layer 3 typically including paper, thermoplastic or a paper/synthetic composite. Protective layer 3 may be bonded to each layer of magnetic medium 2 by high temperature and pressure. The double sided stand alone magnetic card or disk 23 may utilize paper as protective layer 3 and therefore provide for text and/or graphics on respective opposite sides of card or disk 23 to simultaneously function as both a data storage device and a business card or other advertisement media.

Figure 4:
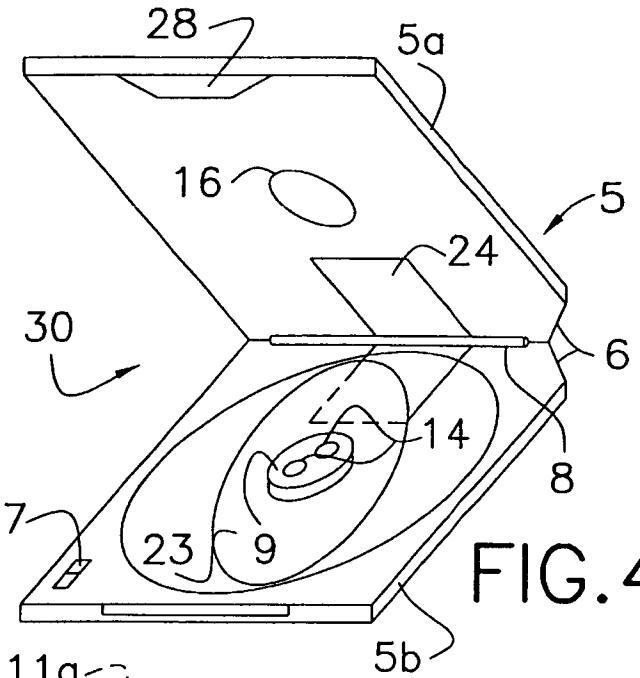
FIG. 4 is a view in perspective of an adapter mechanically engaging a stand alone magnetic card or disk to enable operation in a floppy disk drive according to the present invention.
Figure 6:
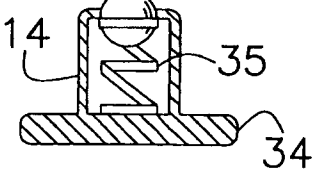
FIG. 6 is a view in section of a ball bearing disposed at the end of a pin extending from the adapter of FIG. 4 to improve rotation of the stand alone magnetic card or disk according to the present invention.
Figure 7C:
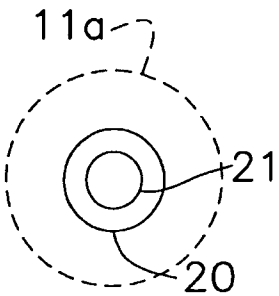
FIG. 7C is a top view in plan of the base of the adapter of FIG. 7B having a circular plate beneath a friction gasket including a substantially centrally disposed pin according to the present invention.
Figure 8A:
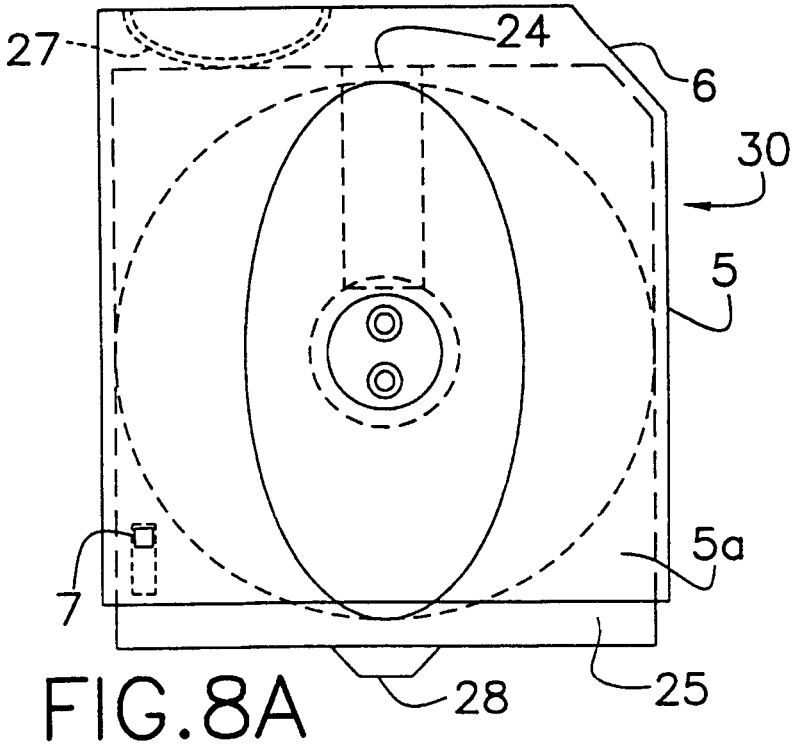
FIG. 8A is a top view in plan of an adapter mechanically engaging a stand alone magnetic card or disk including a drawer for insertion and removal of the card or disk into and out of the adapter according to the present invention.
Figure 8B:
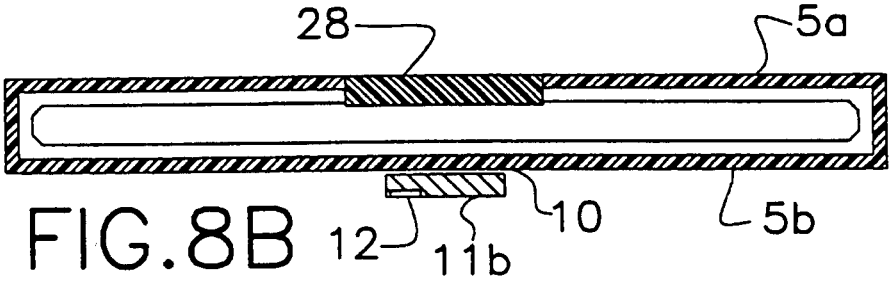
FIG. 8B is a side view in elevation and partial section of the adapter of FIG. 8A.
Figure 8C:
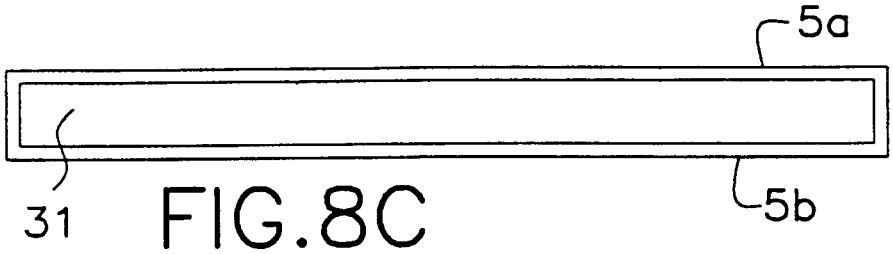
FIG. 8C is a side view in elevation of the drawer opening in the adapter of FIG. 8A.
Figure 8D:
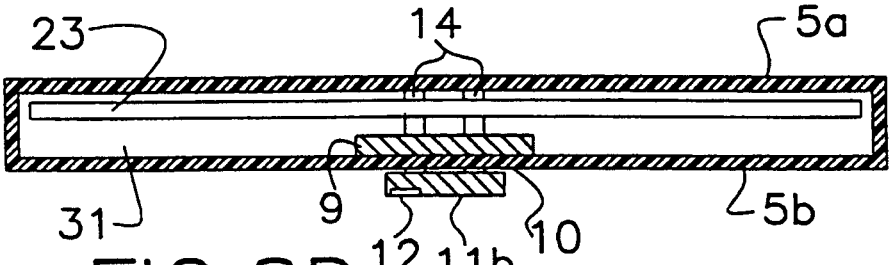
FIG. 8D is a side view in elevation and partial section of a stand alone magnetic card or disk inserted within the adapter of FIG. 8A.

In order to retrieve or store information, the stand alone magnetic card or disk is typically placed in an adapter mechanically engaging the stand along magnetic card or disk for insertion into the standard three and one half inch floppy disk drive as illustrated in FIGS. 4–6. Specifically, adapter 30 enables card or disk 23 to rotate freely within adapter 30 subsequent to insertion into a three and one half inch floppy disk drive thereby enabling read/write heads of the floppy disk drive to retrieve data from and store data on magnetic medium 2 of card or disk 23 (FIGS. 2–3). Adapter 30 typically includes outer shell 5 substantially similar in dimension to a standard three and one-half inch floppy disk, and torque transfer device 9 for transferring the rotary motion of the floppy disk drive to adapter 30 for rotation of card or disk 23. Outer shell 5 typically includes cover 5a and base 5b substantially similar in size, preferably rectangular, and typically made of plastic or metal. Cover 5a and base 5b are pivotably attached to each other along respective adjacent edges by hinge 8 such that cover 5a and base 5b are selectively pivotable to an open or closed position to facilitate insertion and removal of card or disk 23 within adapter 30. Adapter 30 is typically maintained in a closed position, for insertion into a floppy disk drive, by lid clasp 28 substantially centrally disposed at the edge of cover 5a opposite hinge 8. Cover 5a and base 5b are each partially cut away to define a contoured corner 6 disposed adjacent hinge 8 to assure proper orientation of adapter 30 upon insertion into a floppy disk drive. Write protect lock 7 is mounted proximate a corner of base 5b diagonally opposite contoured corner 6 and protects data stored on card or disk 23 from being overwritten wherein a selectively slidable switch enables or disables the protection. Write protect lock 7 is substantially similar to write protect devices on standard three and one-half inch floppy disks.

A torque transfer device 9 is mounted in a circular mounting hole or opening 10 defined through base 5b substantially at the base center. The function of torque transfer device 9 is to apply a rotary force from the floppy disk drive to adapter 30 for rotation of card or disk 23. Specifically, torque transfer device 9 is substantially cylindrical in shape and includes an interior circular end plate 11a and an exterior frusto-conical plate 11b forming respective opposite ends of the torque transfer device. The diameters of interior plate 11a and the larger surface of plate 11b are larger than the diameter of mounting hole or opening 10 in base 5b to assure that torque transfer device 9 is retained in the base. The axial length between facing surfaces of plates 11a and 11b is slightly greater than the thickness of base 5b, and the diameter of torque transfer device 9 intermediate the end plates is less than the diameter of mounting hole or opening 10, thereby assuring that torque transfer device 9 and plate 11a, 11b are free to rotate relative to base 5b. Exterior plate 11b has slots 12 defined in its exteriorly facing surface where the floppy disk drive engages plate 11b to apply a driving rotary force causing torque transfer device 9 to rotate. Card or disk 23 is typically placed on the interior facing surface of interior plate 11a and therefore rotates in conjunction with plate 11a. As card or disk 23 rotates, read/write heads of the floppy disk drive may selectively access the magnetic medium (typically high density) of card or disk 23 via a widow 24, typically rectangular, defined in cover 5a adjacent hinge 8 to expose the magnetic medium of card or disk 23. Base 5b may also contain a window 24 as described above for an adapter accommodating a double sided stand alone magnetic card or disk in order to expose both magnetic medium layers (FIG. 3) of the double sided stand alone magnetic card or disk to read/write heads of the floppy disk drive.

Interior circular plate 11a typically is provided with a gripping arrangement permitting card 23 to be aligned with and secured to plate 11a, enabling the card to rotate with torque transfer device 9. Specifically, torque transfer device 9 includes dual retractable pins 14 equally spaced from the center of plate 11a by a short distance of approximately 0.2 inches and extending from respective platforms 34 disposed between plates 11a, 11b. Each platform 34 includes spring 15 extending from exterior plate 11b to platform 34 in order to provide tension and resiliency for enabling pins 14 to retract. Upon moving cover 5a and base 5b to a closed position, pins 14 contact spin plate 16 substantially centrally disposed in cover 5a. Spin plate 16 may be made of a durable smooth material such as metal or hard plastic. Pins 14 typically slightly retract upon contact with spin plate 16 causing tension from spring 15 to maintain pins 14 in constant contact with spin plate 16. Pins 14 are typically disposed through openings 17 of card or disk 23 (FIG. 1B) and upon moving cover 5a and base 5b to the closed position, card or disk 23 is properly aligned and stored within adapter 30 such that in response to insertion of adapter 30 into a floppy disk drive, card or disk 23 rotates in conjunction with the application of the rotary force from the floppy disk drive as described above without becoming detached from plate 11a.

In order to enhance rotation of card or disk 23, small bearing 18, typically a ball-bearing, may be disposed in each pin 14. Specifically, each pin 14 includes an open ended tip having a substantially circular opening with a diameter slightly smaller than the diameter of the largest circular cross-section of bearing 18 such that bearing 18 is partially retained within the open ended tip of pin 14. Spring 35 is disposed within pin 14 extending from platform 34 to bearing 18 in order to secure bearing 18 against the edges of the substantially circular opening of the open ended tip of pin 14. Upon closing and subsequent insertion of adapter 30 into a floppy disk drive, respective bearings 18 of pins 14 rotatably contact and circularly traverse spin plate 16 during rotation of card or disk 23 thereby reducing friction between pins 14 and spin plate 16 to provide for a smoother rotational movement of card or disk 23.

Alternatively, FIGS. 1A, 7A, 7B, 7C illustrate an adapter with a friction engagement of a stand along magnetic card or disk substantially similar to the adapter mechanically engaging the stand alone magnetic card or disk as described above. Specifically, card or disk 23 includes a single opening 17 substantially centrally disposed through card or disk 23 for use with adapter 30. Adapter 30 is substantially similar to the adapter mechanically engaging the stand alone magnetic card or disk (FIG. 4) and typically includes outer shell 5 and torque transfer device 9 as described above except that torque transfer device 9 has a single pin 21 disposed substantially at the center of plate 11a extending from platform 34. Torque transfer device 9 is disposed through circular mounting hole or opening 10 at substantially the center of base 5b in substantially the same manner as described above. Cover friction device 32 is mounted substantially similar to torque transfer device 9 in circular mounting hole or opening 33 defined through cover 5a substantially at the cover center. Cover friction device 32 is substantially cylindrical in shape and includes respective exterior and interior circular end plates 11c, 11d forming respective opposite ends of the cover friction device. The diameters of plates 11c, 11d are larger than the diameter of mounting hole or opening 33 in cover 5a to assure that cover friction device 32 is retained in the cover. The axial length between the facing surfaces of plates 11c and 11d is slightly greater than the thickness of cover 5a, and the diameter of cover friction device 32 intermediate the end plates 11c, 11d is less than the diameter of mounting hole or opening 33, thereby assuring that cover friction device 32 and plates 11c, 11d are free to rotate relative to cover 5a. Cover friction device 32 further includes indentation 22 disposed substantially at the center of cover friction device 32 for reception of pin 21 when cover 5a and base 5b are moved to a closed position as described below. Friction gaskets 20 are affixed to the interior facing surface of respective interior circular plates 11a, 11d and are typically composed of a tacky or gummy rubber material providing sufficient frictional force to prevent slippage between plate 11a and card or disk 23 during rotation as described above.

Torque transfer device 9 includes retractable pin 21 disposed on platform 34 residing between end plates 11a, 11b with spring 15 extending from exterior plate 11b to platform 34 in order to provide tension and resiliency to enable pin 21 to slightly retract in substantially the same manner as pins 14 (FIG. 5) as described above. Card or disk 23 is typically placed on an interior facing surface of friction gasket 20 affixed to interior plate 11a subsequent to moving cover 5a and base 5b to an open position with pin 21 disposed through opening 17 of card or disk 23 to align card or disk 23 during subsequent rotation. Upon moving cover 5a and base 5b to a closed position, pin 21 is received in indentation 22 and card or disk 23 is engaged by respective friction gaskets 20 of interior plates 11a, 11d to prevent card or disk 23 from slipping or becoming detached from interior plate 11a during subsequent rotation. In response to insertion of adapter 30 into a floppy disk drive, the floppy disk drive engages exterior plate 11b via slots 12 to apply a driving rotary force to rotate torque transfer device 9 as described above. The rotation of torque transfer device 9 causes card or disk 23 to rotate based on friction gaskets 20 providing sufficient frictional force to transfer the driving rotary force from interior plate 11a to card or disk 23. The driving rotary force is transferred from torque transfer device 9 through card or disk 23 and friction gaskets 20 of respective interior plates 11a, 11d to cover friction device 32 thereby causing torque transfer device 9, cover friction device 32, and card or disk 23 to rotate while pin 21 and friction gaskets 20 respectively align and synchronize the rotation of card or disk 23 with the rotation of interior plate 11a. Card or disk 23 is subsequently rotated to traverse read/write heads of the floppy disk drive for information storage and retrieval with access to the magnetic medium of card or disk 23 via window 24 (FIG. 4) as described above.

FIGS. 1B, 5, 8A, 8B, 8C, 8D illustrate an adapter substantially similar to the adapter mechanically engaging a stand alone magnetic card or disk as described above but implementing an alternative technique for inserting and removing the stand alone magnetic cord or disk into and out of the adapter. Specifically, adapter 30 is substantially similar to the adapter mechanically engaging a stand alone magnetic card or disk (FIG. 4) but typically includes a hollow outer shell 5, preferably rectangular and typically made of plastic or metal, having dimensions substantially similar to the standard three and one half inch floppy disk and utilizing a sliding drawer 25 to insert and remove card or disk 23 (typically having dual openings 71) into and out of adapter 30. Outer shell 5 typically includes exterior surfaces 5a, 5b separated by a slight axial distance substantially similar to the thickness of a standard three and one-half inch floppy disk and is partially cut away to define a contoured corner 6 for providing proper orientation of adapter 30 upon insertion into a floppy disk drive. Write protect lock 7 protects data on card or disk 23 from being overwritten as described above and is disposed on exterior surface 5a proximate a corner diagonally opposite contoured corner 6. Drawer 25 is typically rectangular in shape with dimensions slightly smaller than outer shell 5 such that substantially all of drawer 25 fits inside outer shell 5. Drawer 25 is inserted into and removed from adapter 30 via opening 31 typically disposed between exterior surfaces 5a, 5b and adjacent write protect lock 7. Drawer 25 and exterior surface 5a each contain a window 24, typically rectangular, disposed toward the side opposite opening 31 and adjacent contoured corner 6 to enable read/write heads of a floppy disk drive to access the magnetic medium on card or disk 23 as described above. Exterior surface 5b may also contain a window 24 as described above for an adapter accommodating a double 8 sided stand alone magnetic card or disk in order to expose both magnetic medium layers (FIG. 3) of the double sided stand alone magnetic card or disk to read/write heads of the floppy disk drive. Drawer 25 further includes spring lever 27 disposed adjacent window 24 toward the corner opposite contoured corner 6 for applying respective opposing and coincident forces to drawer 25 in order to facilitate smooth lateral movement of drawer 25 into and out of adapter 30. Latch 28 is disposed on an edge of drawer 25 directly across from window 24 to maintain drawer 25 within adapter 30. Torque transfer device 9 is substantially similar to, and is disposed in adapter 30 through mounting hole or opening 10 disposed substantially at the center of exterior surface 5b in substantially the same manner as, the adapter mechanically engaging a stand alone magnetic card or disk (FIG. 4) as described above.

Card or disk 23 is typically placed on drawer 25 and laterally slid into adapter 30 for subsequent insertion into a floppy disk drive. During insertion of drawer 25 into adapter 30, pins 14 typically retract in response to contact with drawer 25 thereby enabling drawer 25 and card or disk 23 to be laterally slid, without interference by pins 14, into position over torque transfer device 9 with pins 14 maintaining constant contact with card or disk 23 via springs 15 as described above. Upon insertion of adapter 30 into a floppy disk drive, torque transfer device 9 engages a driving rotary force from the floppy disk drive to rotate itself and card or disk 23 as described above. Since the orientation of torque transfer device 9 is unknown during insertion of drawer 25 and card or disk 23 into adapter 30, pins 14 may not be initially disposed through dual openings 17 in card or disk 23 when drawer 25 and card or disk 23 are positioned over torque transfer device 9. However, as torque transfer device 9 initially rotates, pins 14 circularly traverse the approximate center area of card or disk 23 and dual openings 17. Upon traversal of dual openings 17 by pins 14, springs 15 force pins 14 through dual openings 17 thereby securing and aligning card or disk 23 to torque transfer device 9 for subsequent rotation as described above. In response to a withdrawal force applied to drawer 25 subsequent to the removal of adapter 30 from the floppy disk drive, pins 14 retract from dual openings 17 in order to enable drawer 25 to be laterally slid out of adapter 30 without interference by pins 14.

The aforementioned adapters or specific components of the adapters may be permanently disposed within a floppy disk drive to create a new and improved floppy disk drive. The new floppy disk drive enables direct insertion of the stand alone magnetic card or disk into the floppy disk drive of a computer for information storage and retrieval. For example, the adapter implementing a sliding drawer (FIG. 8A) may be permanently disposed in a floppy disk drive of a computer such that the drawer is maneuverable into and out of the floppy disk drive. The stand alone magnetic card or disk is placed on the drawer and slid into and out of the floppy disk drive for information storage and retrieval in substantially the same manner as described above. Further, the aforementioned adapters or specific components of the adapters may be permanently disposed in the floppy disk drive in any manner to effectuate drive insertion of the stand alone magnetic card or disk into the floppy disk drive. The floppy disk drive and permanently disposed adapter implement information storage and retrieval in substantially the same manner as described above for the respective adapters.

Since the stand alone magnetic card or disk may include varying shapes, read/write heads of the standard three and one half inch floppy disk drive require special control as the varying card or disk shapes typically produce odd tracking patterns when rotated in an adapter either subsequently inserted into or permanently disposed within a floppy disk drive as described above. FIGS. 1C, 1D, 1E, 9 illustrate a procedure for controlling the read/write heads by a computer based on pre-stored information residing on the stand alone magnetic card or disk. Specifically, card or disk 23 is typically formed according to its shape and such formatting and subsequent address locations are predetermined and recognized by the computer via software. Initially, control software for the read/write heads is loaded into memory (typically RAM). The computer, via the control software, examines a disk residing in the three and one-half inch floppy disk drive (typically drive A or B depending upon the particular configuration of the computer) by rotating the drive mechanism of the floppy disk drive to scan the disk for a code indicating that the inserted disk is a personal computer data card or disk (i.e., card or disk 23) of a varying shape. If the special code is not present, a message is displayed indicating the disk is not a personal computer data card or disk. If a special code is present, the disk is a personal computer data card or disk (i.e., card or disk 23) and is subsequently rotated to the next address where shape and format information for the personal computer data card or disk resides. Based on the shape and format data, a specialized individual software routine corresponding to the shape of the card or disk is accessed from among a plurality of software routines where each software routine corresponds to a particular shape of the card or disk. The accessed software routine controls, via computer, rotation of the personal computer data card or disk and position of the read/write heads to ensure proper tracking and addressing for information storage and retrieval. Upon retrieving data from the personal computer data card or disk, the data is examined to determine whether or not the data has been encoded. Encoded data retrieved from the personal computer data card or disk is subsequently decoded and loaded into the computer memory whereas non-encoded data is typically ignored with the personal computer data card or disk being rotated to a succeeding address for subsequent data retrieval.

It will be appreciated that the embodiments described above and illustrated in the drawings represent only a few of the many ways of implementing the personal computer data card or disk and corresponding adapter.

The shape of the personal computer data card or disk may be any shape capable of rotation within dimensions of a standard three and one-half inch floppy disk, its protective layer may be paper, paper/synthetic composite, thermoplastic or any other material capable of protecting and allowing access to magnetic media, and its magnetic medium may be any magnetic medium (high or low density) capable of being read or written by floppy disk drives of computers. The personal computer data card or disk may include a paper, plastic, cardstock or other suitably rigid or semi-rigid substrate.

The adapter hinge may be placed on any side of the outer shell to open the adapter in any desired position, and may utilize any device or method capable of securing and rotating the card or disk within the adapter when inserted into a floppy disk drive including but not limited to additional openings in the card or disk, and securing the card or disk about its perimeter within the adapter. The adapter may utilize any device or material capable of supplying a resilient force to enable retraction of the pins, and may include any type of bearing, roller or other device capable of improving rotation of cards or disk within the adapter, and may further include any number of windows in varying shapes capable of exposing the personal computer data card or disk to read/write heads of a floppy disk drive.

The friction gaskets may include any tacky or gummy rubber material and any other material capable of securing the card or disk within the adapter.

The drawer of the adapter may freely slide into the adapter from any side and in any lateral direction with respect to the adapter. Further, the drawer may be secured within the adapter from any side.

The control software may be implemented in any hinge or low level computer language or by any hardware capable of controlling the read/write heads.

The personal computer data card or disk and adapter may be utilized in any system having the standard three and one-half inch floppy drive. Further, the present invention may be applied for use with various types of floppy or other disk drives in the same manner as described above.

The adapters or specific components of the adapters may be permanently disposed in a floppy disk drive of a computer in any manner capable of enabling direct insertion of the personal computer data card or disk into the floppy disk drive for information storage and retrieval.

From the foregoing description it will be appreciated that the invention makes available a novel method and apparatus for reading and writing information on a stand alone magnetic cord or disk wherein a magnetic card or disk is inserted into an adapter circuit subsequently inserted into or permanently disposed within a floppy disk drive of a personal computer for information storage and retrieval.

Having described preferred embodiments of a new and improved method and apparatus for reading and writing information on a stand alone magnetic card or disk, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A personal computer data card for insertion into a personal computer to permit data to be transferred between the personal computer and the card, said card comprising:

a first layer of a semi-rigid substrate;

a second layer of a magnetic medium affixed to a first side of said first layer for exchanging data with said personal computer in response to said personal computer rotating said card about an axis perpendicular to said first side and passing through said card to enable said personal computer to manipulate said magnetic medium; and a third layer of protective material affixed to said second layer and permitting access by said personal computer to data on said magnetic medium of said second layer.

2. The card of claim 1 wherein said card has the storage capacity of 0.75 megabytes of data.

3. The card of claim 1 wherein said first layer includes a paper, plastic, or cardstock substrate.

4. The card of claim 3 wherein said third layer includes paper, thermoplastic or a paper/synthetic composite.

5. The card of claim 1 further comprising:

a fourth layer of a magnetic medium affixed to a second side of said first layer for exchanging data with said personal computer; and a fifth layer of said protective material affixed to said fourth layer and permitting access to data on said magnetic medium of said fourth layer.

6. The card of claim 5 wherein said protective material includes paper having printed text or graphics imprinted on said paper.

7. The card of claim 5 wherein said card has a storage capacity of 1.44 megabytes of data.

8. The card of claim 5 wherein said third and fifth layers include paper, thermoplastic or a paper/synthetic composite.

9. The card of claim 8 wherein said third and fifth layers include paper having printed text or graphics imprinted on said paper.

10. The card of claim 1 and further comprising an adapter for enabling said card to be inserted into said personal computer to permit data to be transferred between said personal computer and said card.

11. The card of claim 1 wherein said personal computer includes a disk drive adapted to accommodate said card wherein said card is directly inserted into said drive for information storage and retrieval.

12. A method of storing and retrieving data from a personal computer data card inserted into a personal computer comprising the steps of:

(a) affixing a second layer of a magnetic medium to a first side of a first layer of a semi-rigid substrate;

(b) affixing a third layer of protective material to said second layer such that said protective materials permits access to data on said magnetic medium of said second layer;

and (c) storing and retrieving data from said magnetic medium of said second layer in response to said personal computer rotating said card about an axis perpendicular to said first side and passing through said card to enable said personal computer to manipulate said magnetic medium of said second layer.

13. The method of claim 12 further comprising the steps of:

(d) affixing a fourth layer of a magnetic medium to a second side of said first layer;

(e) affixing a fifth layer of protective material to said fourth layer such that said protective material permits access to data on said magnetic medium of said fourth layer; and (f) storing and retrieving data from said magnetic medium of said fourth layer in response to said personal computer rotating said card.

14. The method of claim 13 wherein steps (c) and (f) include:

storing 1.44 megabytes of data on said card.

15. The method of claim 12 wherein step (c) further includes:

(c.1) placing said card within an adapter for insertion of said card into said personal computer to store and retrieve data from said magnetic medium.

16. The method of claim 12 wherein said personal computer includes a disk drive adapted to accommodate said card, and step (c) further includes:

(c.1) placing said card directly into said drive for information storage and retrieval.

17. A personal computer data card for insertion into an adapter for placement within a personal computer to permit data to be transferred between the personal computer and the card, said card comprising:

a first layer of a semi-rigid substrate;

a second layer of a magnetic medium affixed to a first side of said first layer for exchanging data with said personal computer in response to said personal computer rotating said card relative to said adapter to enable said personal computer to manipulate said magnetic medium; and a third layer of protective material affixed to said second layer and permitting access by said personal computer to data on said magnetic medium of said second layer.

18. A method of storing and retrieving data from a personal computer data card inserted into an adapter for placement within a personal computer comprising the steps of:

(a) affixing a second layer of a magnetic medium to a first side of a first layer of a semi-rigid substrate;

(b) affixing a third layer of protective material to said second layer such that said protective material permits access to data on said magnetic medium of said second layer; and (c) storing and retrieving data from said magnetic medium of said second layer in response to said personal computer rotating said card relative to said adapter to manipulate said magnetic medium of said second layer.

*19. A storage device for insertion into a personal computer to permit data to be transferred between said personal computer and said storage device, said storage device comprising:*

*a data card including a computer readable storage medium to store data pertaining to a business or product and facilitate transfer of said data between said data card and said personal computer in response to said personal computer rotating said data card about an axis perpendicular to and passing through said card to enable said personal computer to access said storage medium, and a material layer having information thereon indicating said business or product associated with said data stored within said storage medium;*

*wherein said card is in the form of a non-circular business type card to advertise and provide information pertain-*

*ing to said business or product to card recipients via said material layer information and said data stored within said storage medium, and wherein said card is directly insertable into a personal computer drive for transfer of information between said card and said personal computer.*

*20. The storage device of claim 19, wherein said storage medium is configured to store data over substantially the entire area of said card.*

*21. The storage device of claim 19, wherein said data card has a shape selected from the group consisting of a polygon and an ellipse.*

*22. The storage device of claim 19, wherein said data card is substantially rectangular.*

*23. The storage device of claim 19, wherein said data card has a shape including at least one linear edge and at least one curved edge.*

*24. A storage device for insertion into a personal computer to permit data to be transferred between said personal computer and said storage device, said storage device comprising:*

*a data card including a computer readable storage medium to store data and facilitate transfer of said data between said data card and said personal computer in response to said personal computer rotating said data card about an axis perpendicular to and passing through said card to enable said personal computer to access said storage medium, wherein said storage medium includes and stores said data within a storage area including a non-circular configuration.*

*25. The storage device of claim 24, wherein said storage medium is configured to store data over substantially the entire area of said card.*

*26. The storage device of claim 24, wherein said data card includes a configuration selected from the group consisting of a polygon and an ellipse.*

*27. The storage device of claim 24, wherein said data card is substantially rectangular.*

*28. The storage device of claim 24, wherein said data card includes a configuration with at least one linear edge and at least one curved edge.*

*29. The storage device of claim 24, wherein said personal computer includes a drive configured to accommodate said card and said card is directly inserted into said drive for transfer of information between said card and said personal computer.*

*30. A method of transferring data between a storage device and a personal computer comprising the steps of:*

*(a) forming a data card including a material layer and a computer readable storage medium to store data pertaining to a business or product, wherein said storage medium facilitates transfer of said data to said personal computer in response to said personal computer rotating said data card about an axis perpendicular to and passing through said card to enable said personal computer to access said storage medium;*

*(b) printing information on said material layer indicating said business or product associated with said data stored within said storage medium; and*

*(c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer.*

*31. The method of claim 30, wherein step (a) further includes:*

*(a.1) configuring said storage medium to store data over substantially the entire area of said card.*

*32. The method of claim 30, wherein step (c) further includes:*

*(c.1) configuring said card in a shape selected from the group consisting of a polygon and an ellipse.*

*33. The method of claim 30, wherein step (c) further includes:*

*(c.1) configuring said data card to be substantially rectangular.*

*34. The method of claim 30, wherein step (c) further includes:*

*(c.1) configuring said data card in a shape including at least one linear edge and at least one curved edge.*

*35. A method of transferring data between a storage device and a personal computer comprising the steps of:*

*(a) forming a data card including a computer readable storage medium to store data and facilitate transfer of said data between said data card and said personal computer in response to said personal computer rotating said data card about an axis perpendicular to and passing through said card to enable said personal computer to access said storage medium; and*

*(b) configuring said storage medium to include and store said data within a data storage area including a non-circular configuration.*

*36. The method of claim 35, wherein step (b)* further includes:

*(b.1) configuring said storage medium to store data over substantially the entire area of said card.*

*37. The method of claim 35, wherein step (a) further includes:*

*(a.1) configuring said data card to include a configuration selected from the group consisting of a polygon and an ellipse.*

*38. The method of claim 35, wherein step (a) further includes:*

*(a.1) configuring said data card to be substantially rectangular.*

*39. The method of claim 35, wherein step (a) further includes:*

*(a.1) configuring said data card to include at least one linear edge and at least one curved edge.*

*40. The method of claim 35, wherein said personal computer includes a drive configured to accommodate said card, and step (a) further includes:*

*(a.1) configuring said card for direct insertion into said drive for transfer of information between said data card and said personal computer.*

*41. A storage device for insertion into a personal computer to permit data to be transferred between said personal computer and said storage device, said storage device comprising:*

*a data card including computer readable storage means for storing data pertaining to a business or product and facilitating transfer of said data between said data card and said personal computer in response to said personal computer rotating said data card about an axis perpendicular to and passing through said card to enable said personal computer to access said storage means, and a material layer having information thereon indicating said business said product associated with said data stored within said storage means;*

*wherein said card is in the form of a non-circular business type card to advertise and provide information pertaining to said business or product to card recipients via said material layer information and said data stored within said storage means, and wherein said card is directly insertable into a personal computer drive for transfer of information between said card and said personal computer.*

*42. A storage device for insertion into a personal computer to permit data to be transferred between said personal computer and said storage device, said storage device comprising:*

*a data card including computer readable storage means for storing data and facilitating transfer of said data between said data card and said personal computer in response to said personal computer rotating said data card about an axis perpendicular to and passing through said card to enable said personal computer to access said storage means, wherein said storage means includes and stores said data within a data storage area including a non-circular configuration.*

* * * * *

UNITED STATES PATENT AND TRADEMARK OFFICE

CERTIFICATE OF CORRECTION

PATENT NO. : RE 38,290 C1
APPLICATION NO. : 90/007202
DATED : May 6, 2008
INVENTOR(S) : David H. Rose It is certified that error appears in the above-identified patent and that said Letters Patent is hereby corrected as shown below:

Title Page, Item (10) Number: "US RE38,290 F1" should read --US RE38,290 C1--.

Signed and Sealed this

Seventh Day of October, 2008

JON W. DUDAS
*Director of the United States Patent and Trademark Office*

US00RE38290F1

(12) EX PARTE REEXAMINATION CERTIFICATE (6220th)

United States Patent

Rose

(10) Number: US RE38,290 F1

(45) Certificate Issued: May 6, 2008

(54) PERSONAL COMPUTER DATA STORAGE CARD AND METHOD FOR TRANSFERRING INFORMATION BETWEEN THE DATA STORAGE CARD AND PERSONAL COMPUTERS

(75) Inventor: David H. Rose, Bethesda, MD (US)

(73) Assignee: Nexomni, LLC, Bethesda, MD (US)

Reexamination Request:
No. 90/007,202, Sep. 14, 2004

Reexamination Certificate for:

| | |
|---|---|
| Patent No.: | **1,038,290** |
| Issued: | **Oct. 28, 2003** |
| Appl. No.: | **09/725,850** |
| Filed: | **Nov. 30, 2000** |

Related U.S. Patent Documents

Reissue of:

| | |
|---|---|
| (64) Patent No.: | **5,844,757** |
| Issued: | **Dec. 1, 1998** |
| Appl. No.: | **08/544,950** |
| Filed: | **Oct. 18, 1995** |

(51) Int. Cl.

| | |
|---|---|
| ***G11B 25/04*** | (2006.01) |
| ***G11B 23/00*** | (2006.01) |
| ***G11B 5/008*** | (2006.01) |
| ***G11B 5/012*** | (2006.01) |
| ***G11B 5/64*** | (2006.01) |
| ***G11B 5/80*** | (2006.01) |
| ***G11B 5/82*** | (2006.01) |
| ***G11B 5/016*** | (2006.01) |

(52) U.S. Cl. ..... 360/131; 360/133; 360/2

(58) Field of Classification Search ..... 360/2, 360/131, 133; 369/75.11, 263; 720/615, 616, 720/618, 745

See application file for complete search history.

(56) References Cited

U.S. PATENT DOCUMENTS

| | | | | |
|---|---|---|---|---|
| 4,800,551 A | | 1/1989 | Norris | |
| 4,868,373 A | | 9/1989 | Opheij et al. | |
| 5,059,774 A | | 10/1991 | Kubo et al. | |
| 5,307,338 A | | 4/1994 | Suzuki et al. | |
| 6,016,959 A | * | 1/2000 | Kamo et al. | 360/2 |

FOREIGN PATENT DOCUMENTS

| | | |
|---|---|---|
| DE | M 95 02 679.7 | 9/1995 |
| DE | M 95 00 647.8 | 10/1995 |
| DE | M 95 03 202.9 | 10/1995 |
| DE | M 95 03 243.6 | 10/1995 |
| DE | M 93 03 239.8 | 3/1996 |
| DE | M 95 03 244.4 | 3/1996 |
| JP | 4-40586 A | 2/1992 |
| WO | WO 86/05620 A1 | 9/1986 |

OTHER PUBLICATIONS

ThinkPad History; "IBM ThinkPad: The history of ThinkPad"; retrieved from the Internet; 3 pages.

(Continued)

*Primary Examiner*—Ovidio Escalante

(57) ABSTRACT

A personal computer data storage card includes a substrate layer, a magnetic medium layer, and a protective layer respectively affixed together. The data storage card is typically placed within an adapter and inserted into a personal computer floppy disk drive wherein the adapter includes dimensions compatible with the floppy disk drive to permit the data storage card to rotate about an axis perpendicular to the plane of the data storage card. During rotation of the data storage card within the floppy disk drive, the data storage card traverses floppy disk drive read/write heads for information storage and retrieval. Paper may be utilized as the protective layer of the data storage card and include text or graphics to have the data storage card simultaneously function as both a data storage device and a business card or other advertisement media. Further, the data storage card may be of any shape permitting rotation of the data storage card within the adapter, and may include an additional magnetic medium layer and protective layer to provide a storage capacity substantially similar to that of standard floppy disks.

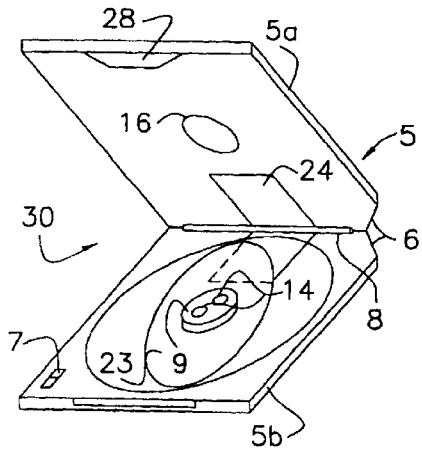

OTHER PUBLICATIONS

BYTE.com; Mar. 1995/Reviews; retrieved from the Internet; 15 pages.
How Stuff Works; retrieved from Internet; http://www.howstuffworks.com/; 5 pages.
Kuhn, K.J.; "Audio Compact Disk—Writing and Reading the Data"; retrieved from Consumer Electronics website; 8 pages.
Kuhn, K.J.; "CD/ROM—An Extension of the CD Audio Standard"; retrieved from Consumer Electronics website; 7 pages.
Search Tech Target; "CD–ROM"; retrieved from Internet www.SearchTechTarget.com; 3 pages.
Wikipedia; "Windows 3.x"; retrieved from Internet Apr. 29, 2004; www.en.wikipedia.org/wiki/Windowns_3.0; 3 pages.
OneOff Media, Inc.; "History of CD Technology"; retrieved from Internet Apr. 29, 2004; www.oneoffcd.com/info/historycd.cfm; 4 pages.
Cooper, Gregory; Collectible Compact Disc Price Guide 2, Shaped CDs; 2 pages.
Richard's Doctor Who Collection Collectibles, Limited Edition Square CD; Retrieved from Internet website last modified Jun. 15, 2003.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 1–18 is confirmed.

Claims 19–25, 27, 28, 30–36, 38, 39, 41 and 42 are cancelled.

Claims 26, 29, 37 and 40 are determined to be patentable as amended.

New claims 43–79 are added and determined to be patentable.

26. The storage device of claim [[24]] 25, wherein said data card includes a configuration selected from the group consisting of a polygon and an ellipse.

29. The storage device of claim [[24]] 26, wherein said personal computer includes a drive configured to accommodate said card and said card is directly [[inserted]] insertable into said drive for transfer of information between said card and said personal computer.

37. The method of claim [[35]] 36, wherein step(a) further includes:

(a.1) configuring said data card to include a configuration selected from the group consisting of a polygon and an ellipse.

40. The method of claim [[35]] 37, wherein said personal computer includes a drive configured to accommodate said card, and step (a) further includes:

[[(a.1)]] (a.2) configuring said card for direct insertion into said drive for transfer of information between said data card and said personal computer.

43. A storage device for insertion into a personal computer to permit data to be transferred between said personal computer and said storage device, said storage device comprising:

a data card including computer readable storage means for storing data and facilitating transfer of said data between said data card and said personal computer in response to said personal computer rotating said data card about an axis perpendicular to and passing through said card to enable said personal computer to access said storage means, wherein said storage means includes and stores said data within a data storage area including a non-circular configuration;

wherein said storage means is configured to store data over substantially the entire area of said card and said data card includes a configuration selected from the group consisting of a polygon and an ellipse.

44. A storage device for insertion into a personal computer to permit data to be transfered between said personal computer and said storage device, said storage device comprising:

a data card including a computer readable storage medium to store data pertaining to a business or product and facilitate transfer of said data between said data card and said personal computer in response to said personal computer rotating said data card about an axis perpendicular to and passing through said card to enable said personal computer to access said storage medium, and a material layer having information thereon indicating said business or product associated with said data stored within said storage medium, wherein said storage medium is configured to store data for display on a monitor of said personal computer;

wherein said card is in the form of a non-circular business type card to advertise and provide information pertaining to said business or product to card recipients via said material layer information and said data stored within said storage medium, and wherein said card is directly insertable into a personal computer drive for transfer of information between said card and said personal computer;

wherein said data card has a shape selected from the group consisting of a polygon and an ellipse and is configured to provide at least graphical information pertaining to said business or product to card recipients via said material layer information and said data stored within said storage medium.

45. The storage device of claim 44, wherein said data card includes and stores said data within a data storage area including a non-circular configuration.

46. A storage device for insertion into a personal computer to permit data to be transferred between said personal computer and said storage device, said storage device comprising:

a data card including a computer readable storage medium to store data pertaining to a business or product and facilitate transfer of said data between said data card and said personal computer in response to said personal computer rotating said data card about an axis perpendicular to and passing through said card to enable said personal computer to access said storage medium, and a material layer having information thereon indicating said business or product associated with said data stored within said storage medium, wherein said storage medium is configured to store content data for display by said personal computer and a corresponding identifier identifying said content data, and wherein said content data includes information indicating said business or product;

wherein said card is in the form of a non-circular business type card to advertise and provide information pertaining to said business or product to card recipients via said material layer information and said data stored within said storage medium, and wherein said card is directly insertable into a personal computer drive for transfer of information between said card and said personal computer;

wherein said data card has a shape selected from the group consiting of a polygon and an ellipse and is configured to provide at least graphical information pertaining to said business or product to card recipients via said material layer information and said data stored within said storage medium.

47. A method of transferring data between a storage device and a personal computer comprising the steps of:

(a) forming a data card including a material layer and a computer readable storage medium to store data pertaining to a business or product, wherein said storage medium facilitates transfer of said data to said personal computer in response to said personal computer rotating said data card about an axis perpendicular to and passing through said card to enable said personal computer to access said storage medium;

(b) printing information on said material layer indicating said business or product associated with said data stored within said storage medium; and (c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer, and wherein step (c) further includes:

(c.1) configuring said card in a shape selected from the group consisting of a polygon and an ellipse and to provide at least graphical information pertaining to said business or product to card recipients via said material layer information and said data stored within said storage medium, wherein step (c.1) further includes:

(c.1.1) configuring said storage medium to store data for display on a monitor of said personal computer.

48. The method of claim 47, wherein step(c.1.1) further includes:

(c.1.1.1) configuring said data card to include and store said data within a data storage area including a non-circular configuration.

49. A method of transferring data between a storage device and a personal computer comprising the steps of:

(a) forming a data card including a material layer and a computer readable storage medium to store data pertaining to a business or product, wherein said storage medium facilitates transfer of said data to said personal computer in response to said personal computer rotating said data card about an axis perpendicular to and passing through said card to enable said personal computer to access said storage medium;

(b) printing information on said material layer indicating said business or product associated with said data stored within said storage medium; and (c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer, and wherein step (c) further includes:

(c.1) configuring said card in a shape selected from the group consisting of a polygon and an ellipse and to provide at least graphical information pertaining to said business or product to card recipients via said material layer information and said data stored within said storage medium, wherein step (c.1) further includes:

(c.1.1) configuring said storage medium to store content data for display by said personal computer and a corresponding identifier identifying said content data, wherein said content data includes information indicating said business or product.

50. A storage device to permit data to be transferred with a personal computer, wherein said personal computer includes a data address system to store and retrieve data files within a directory structure, said storage device comprising:

a data card including a computer readable storage medium formatted in accordance with said data address system of said personal computer to store data files with data pertaining to a business or product and facilitate access of said stored data files and transfer of said data between said data card and said personal computer in response to said personal computer rotating said data card about an axis perpendicular to and passing through said card to enable said personal computer to access said storage medium, and a material layer including information thereon indicating said business or product associated with said data stored within said storage medium;

wherein said card is in the form of a non-circular business type card to advertise and provide information pertaining to said business or product to card recipients via said material layer information and said data stored within said storage medium, and wherein said card is directly insertable into a personal computer drive for transfer of information between said card and said personal computer;

wherein said data card has a shape selected from the group consisting of a polygon and an ellipse.

51. The storage device of claim 50 further including:

a personal computer including said data address system and said personal computer drive to receive and transfer data with said data card.

52. The storage device of claim 50, wherein said storage medium is configured to store data for display on a monitor of said personal computer.

53. The storage device of claim 50, wherein said storage medium is configured to store content data for display by said personal computer and a corresponding identifier identifying said content data, wherein said content data includes information indicating said business or product.

54. The storage device of claim 50, wherein said computer readable storage medium encompasses a non-circular area of said data card.

55. The storage device of claim 50, wherein said computer readable storage medium includes control information facilitating execution of instructions by said personal computer causing access of said data card.

56. A method of transferring data between a storage device and a personal computer, wherein said personal computer includes a data address system to store and retrieve data files within a directory structure, said method comprising:

(a) forming a data card including a material layer and a computer readable storage medium formatted in accordance with said data address system of said personal computer to store data files with data pertaining to a business or product, wherein said storage medium facilitates access of said stored files and transfer of said data to said personal computer in response to said personal computer rotating said data card about an axis perpendicular to and passing through said card to enable said personal computer to access said storage medium;

(b) printing information on said material layer indicating said business or product associated with said data stored within said storage medium; and (c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer, wherein step (c) further includes:

(c.1) configuring said card in a shape selected from the group consisting of a polygon and an ellipse.

57. The method of claim 56 further including:

(d) transferring information between said data card and said personal computer in response to said personal computer rotating said data card.

58. The method of claim 56, wherein step(c) further includes:

(c.2) configuring said storage medium to store data for display on a monitor of said personal computer.

59. The method of claim 56, wherein step(c) further includes:

(c.2) configuring said computer readable storage medium to store content data for display by said personal computer and a corresponding identifier identifying said content data, wherein said content data includes information indicating said business or product.

60. The method of claim 56, wherein step(c) further includes:

(c.2) configuring said computer readable storage medium to encompass a non-circular area of said data card.

61. The method of claim 56, wherein step(c) further includes:

(c.2) configuring said computer readable storage medium to include control information facilitating execution of instructions by said personal computer causing access of said data card.

62. A storage device for insertion into a personal computer to permit data to be transferred between said personal computer and said storage device, said storage device comprising:

a data card including a computer readable storage medium to store data pertaining to a business or product and facilitate transfer of said data between said data card and said personal computer in response to said personal computer rotating said data card about an axis perpendicular to and passing through said card to enable said personal computer to access said storage medium, and a material layer including information thereon indicating said business or product associated with said data stored within said storage medium;

wherein said card is in the form of a non-circular business type card to advertise and provide information pertaining to said business or product to card recipients via said material layer information and said data stored within said storage medium, and wherein said card is directly insertable into a personal computer drive for transfer of information between said card and said personal computer;

wherein said data card has a shape including a plurality of convex edge portions and a plurality of intermediate linear edges coupled to and extending between said convex edge portions, wherein said convex edge portions include a first convex edge portion and a second convex edge portion and said intermediate linear edges are arranged in parallel and connected to and extend between said first and second convex edge portions.

63. A method of transferring data between a storage device and a personal computer comprising:

(a) forming a data card including a material layer and a computer readable storage medium to store data pertaining to a business or product, wherein said storage medium facilitates transfer of said data to said personal computer in response to said personal computer rotating said data card about an axis perpendicular to and passing through said card to enable said personal computer to access said storage medium;

(b) printing information on said material layer indicating said business or product associated with said data stored within said storage medium; and (c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer, and wherein step (c) further includes:

(c.1) configuring said card in a shape including a plurality of convex edge portions and a plurality of intermediate linear edges coupled to and extending between said convex edge portions, wherein said plurality of convex edge portions includes a first convex edge portion and a second convex edge portion;

(c.2) configuring said card with said plurality of intermediate linear edges connected to and extending between said first and second convex edge portions; and (c.3) configuring said plurality of intermediate linear edges to be arranged in parallel.

64. A storage device for insertion into a personal computer to permit data to be transferred between said personal computer and said storage device, said storage device comprising:

a data card including a computer readable storage medium to store data pertaining to a business or product and facilitate transfer of said data between said data card and said personal computer in response to said personal computer rotating said data card about an axis perpendicular to and passing through said card to enable said personal computer to access said storage medium, and a material layer including information thereon indicating said business or product associated with said data stored within said storage medium;

wherein said card is in the form of a non-circular business type card to advertise and provide information pertaining to said business or product to card recipients via said material layer information and said data stored within said storage medium, and wherein said card is directly insertable into a personal computer drive for transfer of information between said card and said personal computer;

wherein said data card is configured to provide at least one of graphics and text information pertaining to said business or product to card recipients via said material layer information and said data stored within said storage medium, and said storage medium is configured to store data for display on a monitor of said personal computer.

65. The storage device of claim 64, wherein said storage medium is configured to store content data for display by said personal computer and a corresponding identifier identifying said content data, wherein said content data includes information indicating said business or product.

66. The storage device of claim 64, wherein said data card includes and stores said data within a data storage area including a non-circular configuration.

67. A method of transferring data between a storage device and a personal computer comprising:

(a) forming a data card including a material layer and a computer readable storage medium to store data pertaining to a business or product, wherein said storage medium facilitates transfer of said data to said personal computer in response to said personal computer rotating said data card about an axis perpendicular to and passing through said card to enable said personal computer to access said storage medium;

(b) printing information on said material layer indicating said business or product associated with said data stored within said storage medium; and (c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer, and wherein step (c) further includes:

(c.1) configuring said card to provide at least one of graphics and text information pertaining to said business or product to card recipients via said material layer information and said data stored within said storage medium; and (c.2) configuring said storage medium to store data for display on a monitor of said personal computer.

68. The method of claim 67, wherein step (c.2) further includes:

(c.2.1) configuring said storage medium to store content data for display by said personal computer and a corresponding identifier identifying said content data, wherein said content data includes information indicating said business or product.

69. The method of claim 67, wherein step(c.1) further includes:

(c.1.1) configuring said data card to include and store said data within a data storage area including a non-circular configuration.

70. A storage device to permit data to be transferred with a personal computer, wherein said personal computer includes a data address system to store and retrieve data files within a directory structure, said storage device comprising:

a data card including a computer readable storage medium formatted in accordance with said data address system of said personal computer to store data files with data pertaining to a business or product and facilitate access of said stored data files and transfer of said data between said data card and said personal computer in response to said personal computer rotating said data card about an axis perpendicular to and passing through said card to enable said personal computer to access said storage medium, and a material layer including information thereon indicating said business or product associated with said data stored within said storage medium;

wherein said card is in the form of a non-circular business type card to advertise and provide information pertaining to said business or product to card recipients via said material layer information and said data stored within said storage medium, and wherein said card is directly insertable into a personal computer drive for transfer of information between said card and said personal computer;

wherein said storage medium is configured to store data for display on a monitor of said personal computer.

71. The storage device of claim 70 further including:

a personal computer including said data address system and said personal computer drive to receive and transfer data with said data card.

72. The storage device of claim 70, wherein said storage medium is configured to store content data for display by said personal computer and a corresponding identifier identifying said content data, wherein said content data includes information indicating said business or product.

73. The storage device of claim 70, wherein said computer readable storage medium encompasses a non-circular area of said data card.

74. The storage device of claim 70, wherein said computer readable storage medium includes control information facilitating execution of instructions by said personal computer causing access of said data card.

75. A method of transferring data between a storage device and a personal computer, wherein said personal computer includes a data address system to store and retrieve data files within a directory structure, said method comprising:

(a) forming a data card including a material layer and a computer readable storage medium formatted in accordance with said data address system of said personal computer to store data files with data pertaining to a business or product, wherein said storage medium facilitates access of said stored files and transfer of said data to said personal computer in response to said personal computer rotating said data card about an axis perpendicular to and passing through said card to enable said personal computer to access said storage medium;

(b) printing information on said material layer indicating said business or product associated with said data stored within said storage medium; and (c) configuring said card in the form of a non-circular business type card to advertise and provide information pertaining to said business or product to card recipients via said printed information and said data stored within said storage medium, wherein said card is directly insertable into a personal computer drive for transfer of information between said card and said personal computer, wherein step (c) further includes:

(c.1) configuring said storage medium to store data for display on a monitor of said personal computer.

76. The method of claim 75 further including:

(d) transferring information between said data card and said personal computer in response to said personal computer rotating said data card.

77. The method of claim 75, wherein step(c.1) further includes:

(c.1.1) configuring said computer readable storage medium to store content data for display by said personal computer and a corresponding identifier identifying said content data, wherein said content data includes information indicating said business or product.

78. The method of claim 75, wherein step(c) further includes:

(c.2) configuring said computer readable storage medium to encompass a non-circular area of said data card.

79. The method of claim 75, wherein step(c) further includes:

(c.2) configuring said computer readable storage medium to include control information facilitating execution of instructions by said personal computer causing access of said data card.

* * * * *

US00RE38290C2

(12) EX PARTE REEXAMINATION CERTIFICATE (9227th)

United States Patent

Rose

(10) Number: US RE38,290 C2
(45) Certificate Issued: Aug. 21, 2012

(54) PERSONAL COMPUTER DATA STORAGE CARD AND METHOD FOR TRANSFERRING INFORMATION BETWEEN THE DATA STORAGE CARD AND PERSONAL COMPUTERS

(75) Inventor: David H. Rose, Bethesda, MD (US)

(73) Assignee: Nexomni, LLC, Bethesda, MD (US)

Reexamination Request:
No. 90/009,749, Jul. 15, 2010

Reexamination Certificate for:

| | |
|---|---|
| Patent No.: | **Re. 38,290** |
| Issued: | **Oct. 28, 2003** |
| Appl. No.: | **09/725,850** |
| Filed: | **Nov. 30, 2000** |

Reexamination Certificate C1 1,038,290 issued May 6, 2008

Certificate of Correction issued Oct. 7, 2008.

Related U.S. Patent Documents

Reissue of:

| | |
|---|---|
| (64) Patent No.: | **5,844,757** |
| Issued: | **Dec. 1, 1998** |
| Appl. No.: | **08/544,950** |
| Filed: | **Oct. 18, 1995** |

(51) Int. Cl.

| | |
|---|---|
| ***G11B 25/04*** | (2006.01) |
| ***G11B 23/00*** | (2006.01) |
| ***G11B 5/80*** | (2006.01) |
| ***G11B 5/82*** | (2006.01) |
| ***G11B 23/03*** | (2006.01) |
| ***G11B 5/74*** | (2006.01) |

(52) U.S. Cl. ..... 360/131; 360/133; 360/2

(58) Field of Classification Search ..... None
See application file for complete search history.

(56) References Cited

To view the complete listing of prior art documents cited during the proceeding for Reexamination Control Number 90/009,749, please refer to the USPTO's public Patent Application Information Retrieval (PAIR) system under the Display References tab.

*Primary Examiner*—Joseph R. Pokrzywa

(57) ABSTRACT

A personal computer data storage card includes a substrate layer, a magnetic medium layer, and a protective layer respectively affixed together. The data storage card is typically placed within an adapter and inserted into a personal computer floppy disk drive wherein the adapter includes dimensions compatible with the floppy disk drive to permit the data storage card to rotate about an axis perpendicular to the plane of the data storage card. During rotation of the data storage card within the floppy disk drive, the data storage card traverses floppy disk drive read/write heads for information storage and retrieval. Paper may be utilized as the protective layer of the data storage card and include text or graphics to have the data storage card simultaneously function as both a data storage device and a business card or other advertisement media. Further, the data storage card may be of any shape permitting rotation of the data storage card within the adapter, and may include an additional magnetic medium layer and protective layer to provide a storage capacity substantially similar to that of standard floppy disks.

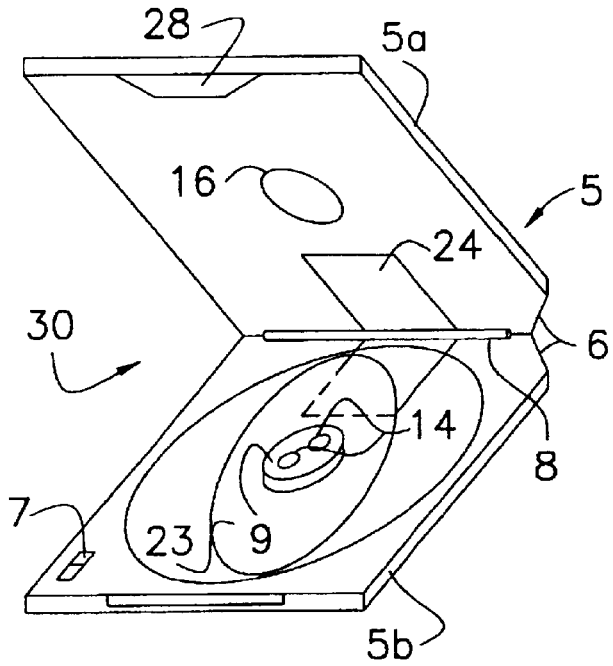

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 19-25, 27, 28, 30-36, 38, 39, 41 and 42 were previously cancelled.

Claims 1-18, 26, 29, 37, 40 and 43-79 are cancelled.

* * * * *